(12) United States Patent
Kirrmann et al.

(10) Patent No.: US 6,240,528 B1
(45) Date of Patent: May 29, 2001

(54) METHOD OF TESTING A CONTROL SYSTEM

(75) Inventors: Hubert Kirrmann, Baden (CH); Peter Terwiesch, Edingen-Neckarhausen (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/149,172

(22) Filed: Sep. 8, 1998

(30) Foreign Application Priority Data

Sep. 9, 1997 (DE) ................................. 197 39 380

(51) Int. Cl.$^7$ ....................................... G06F 11/00
(52) U.S. Cl. ................................................. 714/25
(58) Field of Search ........................ 714/25, 6, 8, 10, 714/11, 26, 32, 33, 37, 38, 47, 39, 45, 46

(56) References Cited

U.S. PATENT DOCUMENTS

| | | | |
|---|---|---|---|
| 4,096,989 | * | 6/1978 | Tawfik ................................. 235/307 |
| 4,287,565 | * | 9/1981 | Haubner et al. ...................... 364/580 |
| 4,333,177 | * | 6/1982 | Sutterlin ................................. 371/15 |
| 5,541,504 | * | 7/1996 | Kubo et al. ........................ 324/158.1 |
| 5,564,012 | * | 10/1996 | Shigyo et al. ................... 395/182.13 |

FOREIGN PATENT DOCUMENTS 0 368 190    5/1990 (EP) .

OTHER PUBLICATIONS

Hassler et al., Test appts. for Vehicle electronic control system—has software store containing test inormation to repalce operating software module and I/O connector, Derwent–Week, 1–2, Mar. 1988.*

Von Andreas Danuser and Hannes Rüscher, "What Happens When and Where In The Program", Technische Rundschau 35/1990, pp. 48–57.

* cited by examiner

Primary Examiner—Nadeem Iqbal
(74) Attorney, Agent, or Firm—Burns, Doane, Swecker & Mathis, L.L.P.

(57) ABSTRACT

Specimen programs (S1) of a specimen object (1) can be tested by means of an observation tool (2), and the duration of program routines registered and evaluated. In order to achieve a better testing depth, the observation tool (2) is additionally supplied with at least one measurement and/or process signal from at least one simulated process (P') from a real time simulator (4) or from a process (P) of a plant (3). At least one signal is transmitted from the simulated process (P') to the observation tool (2), it being possible for this signal to be generated by the process (P) or (P'), and said signal triggering a test by the observation tool (2).

4 Claims, 1 Drawing Sheet

METHOD OF TESTING A CONTROL SYSTEM

BACKGROUND OF THE INVENTION

1. Field of the Invention

The invention takes as its starting point a method of testing a control system.

2. Discussion of Background

With the preamble of patent claim 1, the invention refers to a prior art as is disclosed by Andreas Danuser and Hannes Rüscher in Was geschieht wann wo im Programm? [What happens when and where in the program], Technische Rundschau 35/1990, pp. 48–57. In the latter, a description is given of an observation tool which inserts instructions of the form:

MOVE (TAG, ADDR)

into the program to be tested, for example at the start and end of routines to be tested in the program, as a marker in the source text. In this case, TAG means a number which is allocated uniquely to the point in the program, and ADDR means an address at which a connecting point is addressed. When a marker inserted in this way is reached during the running of the source program, the instruction MOVE sends the TAG via the connection to the observation tool. In addition to the TAG, it is also possible for variable values to be transmitted. In the observation tool, a connection point receives the TAG, registers its arrival time and stores this information in an event list. The evaluation of the event list makes it possible to determine how much time is needed for which program section or how often a program section is executed. Statistics about the program flow can be compiled. If it is desired to observe a plurality of parallel computers simultaneously, a plurality of connection points are used, synchronized in time.

However, this observation tool does not register any external events; it records only points in the program, possibly with variable values, which are executed in the computers.

An observation tool of this type is described in more detail in EP 0 368 190 A1.

SUMMARY OF THE INVENTION

Accordingly, one object of the invention, is to develop a novel method of testing a control system of the type cited at the beginning, in such a way that external events can also be observed, that is to say that measurement and error signals from physical processes which interact with the computers can also be registered at the same time.

One advantage of the invention is that the testing depth can be improved significantly. As a result of it being possible for the observation tool to receive measurement signals and error signals, it is possible to set up and evaluate logical and chronological checks there.

According to an advantageous refinement of the invention, it is possible to connect, instead of a physical process, a real time simulator, which allows the simulation of operating states or faults, which, on cost grounds, can scarcely be tested in a real time process. It is thus possible to detect and avoid undesired and, under certain circumstances, hazardous situations in a process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
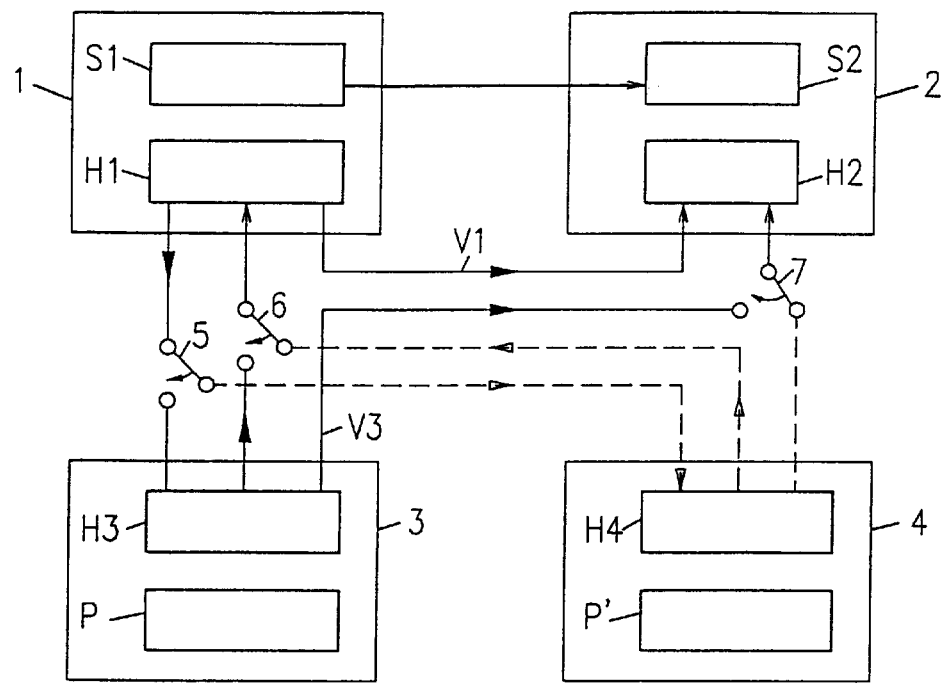
FIG. 1 shows a block diagram with a specimen object, an observation tool, a plant with a process and a real time simulator.

Referring now to the drawings, wherein like reference numerals designate identical or corresponding parts throughout the several views, according to FIG. 1, a control, regulating and/or protective system to be tested, or a control system or a specimen object (1) having a program to be tested or a specimen program (S1) and a connection point (H1) is tested by means of an observation tool (2) having an analysis program (S2) and a connection point (H2), the test being in accordance with the method of A. Danuser and H. Rüscher described at the beginning. For this purpose, the specimen program (S1) and the analysis program (S2) have a communications connection to each other via a connecting line (V1), in order to exchange information about the current program flow in the specimen program (S1).

The connection point (H1) of the specimen object (1) also has a reciprocal connection, via a first and second switch (5, 6), to a connection point (H3) of a system to be regulated or to be controlled or to be protected and belonging to a machine or a plant (3), this connection permitting transmission of measurement signals and/or error signals from the plant (3) to the specimen object (1), and of commands and/or actuating variables from the specimen object (1) to the plant (3). The plant (3) has at least one physical or technical or chemical process (P). In addition, the connection points (H1) and (H3) are connected via connecting lines (V1) and (V3), the latter via a third switch (7), to signal inputs of the connection point (H2). Using these connecting lines (V1, V3), a relationship can be produced between events progressing in the process (P) and in the specimen program (S1).

Instead of the entire plant (3), use can also be made of a real time simulator (4) having a connection point (H4) and a simulator program or a process simulator (P'), which wholly or partially simulates the process (P). The optional use of the real process (P) or of the simulated process (P') is made possible by the switches (5–7).

In order to permit the evaluation of the events, the output signals from the real time simulator (4) and/or from the plant (3) are provided with a marker, corresponding to a program marker in the specimen program (S1). It thus becomes possible to track an entire sequence from the connection point (H4) of the real time simulator (4), through the real time program (S1) of the specimen object (1), and back again to the connection point (H4) of the real time simulator (4). The same is true of the connection point (H3).

By means of a test with the real time simulator (4), it is possible to test in particular faults which, for reasons of safety or costs, can scarcely be carried out with the real plant (3). Higher reliability of the operation of this plant (3) is thus achieved, it being possible for said plant to remain connected to the observation tool (2) even during operation.

EXAMPLE

During the test of a specimen object (1), for example of a protective device, a fault is defined using the real time simulator (4) and, at the same time, as the first effect of the simulator, a binary flank is transmitted to the simulator output (H4), this triggering the recording in the observation tool (2) and serving as reference time. The recording/processing therefore begins in the observation tool (2) before the specimen program (S1) can react. It is then possible, for example in addition to the other observation, for the time to be measured until the specimen program (S1) reacts to this flank, that is to say, for example, until a handling routine is called. This time is communicated to the observation tool (2) via the connecting line (V1). The usual evaluation is then carried out in the observation tool (2).

Figure 2:
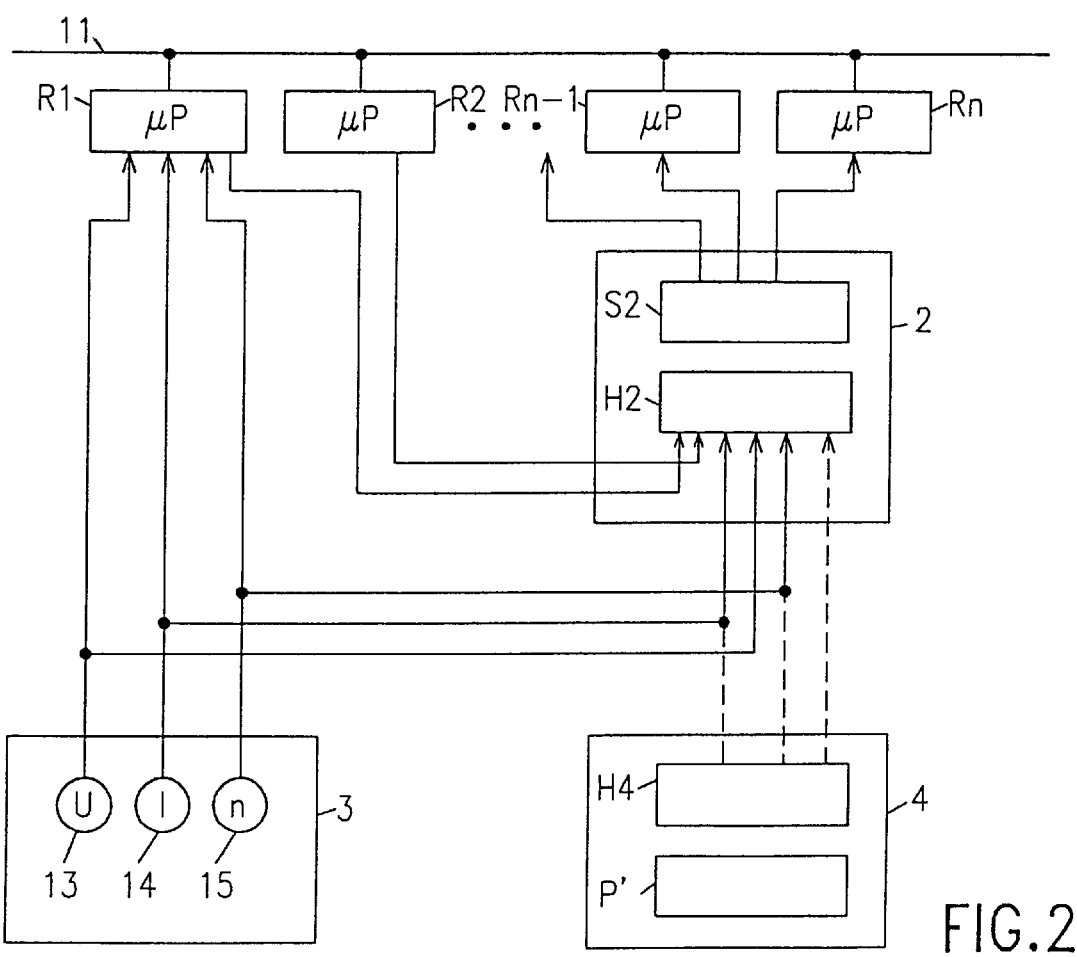
FIG. 2 shows a multi-computer arrangement with an observation tool and a real time simulator according to FIG. 1.

FIG. 2 shows a plurality of microprocessors or computers (R1–Rn), which are connected to one another via a process data bus (11) and can exchange data and instructions. All or some of these computers (R1–Rn) correspond to the specimen object (1) according to FIG. 1; they are connected on one side to the observation tool (2) and to a real time simulator (4) and/or the plant (3) according to FIG. 1. The computers (R1–Rn) may be, for example, distributed computers of the control system of a locomotive, which cooperate with a main computer or have equal rights. In this case, the signals exchanged between the connection points (H1) and (H3) or (H4) are appropriately converted voltage or current or speed information (U, I, n) from a voltage, current and speed transmitter (13 –15) and binary switching signals (not illustrated).

It goes without saying that, instead of voltage (U), current (I) and speed (n), other measured variables and process faults can also be registered and transmitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of testing at least one control system of at least one process of a plant (3), a) which control system contains at least one specimen program (S1) in at least one computer (1; R1–Rn), b) this at least one computer (1; R1–Rn) being operatively connected to an observation tool (2), which permits a registration of the chronological and logical flow of at least one program routine of the at least one specimen program (S1) in the observation tool, wherein c) the observation tool (2) is additionally supplied with at least one measurement and/or process signal from the at least one process.

2. The method as claimed in claim 1, wherein the at least one process is a simulated process of a real time simulator (4).

3. The method as claimed in claim 1, wherein the observation tool (2) treats the measurement and/or process signal, which comes from the at least one process, as a marker which comes from a computer (1; R1–Rn).

4. The method as claimed in claim 2, wherein at least one code is transmitted from the simulated process to the observation tool (2), and this code triggers the registration in the observation tool (2).

* * * * *